United States Patent
Fries

(10) Patent No.: US 10,435,871 B2
(45) Date of Patent: Oct. 8, 2019

(54) DRINKING AND SERVICE WATER SUPPLY DEVICE OF A BUILDING, AND REGULATING VALVE THEREFOR

(71) Applicant: Gebr. Kemper GmbH + Co. KG Metallwerke, Olpe (DE)

(72) Inventor: Stefan Fries, Olpe (DE)

(73) Assignee: GEBR. KEMPER GMBH + CO. KG METALLWERKE, Olpe (DE)

( * ) Notice: Subject to any disclaimer, the term of this patent is extended or adjusted under 35 U.S.C. 154(b) by 0 days.

(21) Appl. No.: 15/241,897

(22) Filed: Aug. 19, 2016

(65) Prior Publication Data
US 2017/0067231 A1    Mar. 9, 2017

(30) Foreign Application Priority Data
Sep. 7, 2015 (DE) .................. 20 2015 006 3663 U

(51) Int. Cl.
*F16K 31/00* (2006.01)
*E03B 7/04* (2006.01)
(Continued)

(52) U.S. Cl.
CPC ............... *E03B 7/04* (2013.01); *E03B 7/075* (2013.01); *E03B 7/077* (2013.01); *E03B 7/078* (2013.01);
(Continued)

(58) Field of Classification Search
CPC . E03B 7/04; E03B 7/075; E03B 7/077; E03B 7/078; F16K 15/18; F16K 31/002;
(Continued)

(56) References Cited

U.S. PATENT DOCUMENTS

| | | | |
|---|---|---|---|
| 2,377,132 A * | 5/1945 | Crowe | F16K 17/00 137/493.2 |
| 6,530,391 B1 * | 3/2003 | Dulin | E03B 7/12 137/2 |

(Continued)

FOREIGN PATENT DOCUMENTS

| | | |
|---|---|---|
| AT | 228 018 B | 6/1963 |
| AT | 228018 | 6/1963 |

(Continued)

OTHER PUBLICATIONS

European Search Report for Application No. 16179932.5 dated Feb. 6, 2017.
(Continued)

*Primary Examiner* — Marina A Tietjen
*Assistant Examiner* — Paul J Gray
(74) *Attorney, Agent, or Firm* — Fay Sharpe LLP

(57) ABSTRACT

The present invention relates to a drinking and service water supply device (1) of a building with at least one circulation pipe (3) leading to at least one consumer (12) and with a regulating valve installed in the circulation pipe, and in a coordinated aspect to a regulating valve (18) for hot-water circulation systems, comprising a valve housing (20) into which a thermostatic element (25) which is controlled by water temperature is installed as a setting member for a regulation member (30) which cooperates with a valve seat (34) with a flow opening (35) between inlet and outlet channel (21, 22) of the valve housing (20) for regulating the water flow rate. It is desired in drinking and service water supply devices that strongly cooled-down hot water is replaced as rapidly as possible by heated water to avoid, if possible, germ formation in the water and a drop of the water temperature at the consumer. For the improved solution of these problems the present invention wants to indicate a direction-dependent regulation element (37; 41, 30) which
(Continued)

with a flow (V) through the regulating valve (18) in one direction increases the flow coefficient $C_v$ of the regulating valve (18) independently of the position of the setting member and with a flow through the regulating valve (18) in opposite direction does not cause an increase of the flow coefficient $C_v$.

11 Claims, 6 Drawing Sheets

(51) Int. Cl.
*E03B 7/07* (2006.01)
*F16K 1/52* (2006.01)
*F16K 1/54* (2006.01)
*F16K 15/06* (2006.01)
*F16K 15/18* (2006.01)

(52) U.S. Cl.
CPC ............... *F16K 1/52* (2013.01); *F16K 1/54* (2013.01); *F16K 15/063* (2013.01); *F16K 15/18* (2013.01); *F16K 31/002* (2013.01)

(58) Field of Classification Search
CPC .... F25B 41/062; G05D 23/02; G05D 23/024; G05D 23/025; G05D 23/026
USPC .......................... 137/337; 236/93 R; 285/340
See application file for complete search history.

(56) References Cited

U.S. PATENT DOCUMENTS

| | | | |
|---|---|---|---|
| 8,052,406 B2* | 11/2011 | Li .................. | F04C 18/0215 137/454.4 |
| 2008/0283131 A1* | 11/2008 | Etter ................ | A47J 31/46 137/517 |
| 2009/0145490 A1 | 6/2009 | Kershisnik | |
| 2012/0326064 A1* | 12/2012 | Sanuki ............... | F25B 41/062 251/129.15 |
| 2014/0352812 A1* | 12/2014 | Dulin ................ | F16K 31/002 137/468 |
| 2016/0004264 A1* | 1/2016 | Watts ............... | G05D 23/022 236/99 K |

FOREIGN PATENT DOCUMENTS

| | | |
|---|---|---|
| DE | 29805921 U1 | 4/1998 |
| DE | 298 05 921 U1 | 6/1998 |
| DE | 298 23 960 U1 | 2/2000 |
| EP | 2098645 A1 | 3/2009 |
| EP | 2 098 645 A1 | 9/2009 |

OTHER PUBLICATIONS

German Search Report dated May 13, 2016 issued in priority German Application Serial No. 202015006366.7.

* cited by examiner

DRINKING AND SERVICE WATER SUPPLY DEVICE OF A BUILDING, AND REGULATING VALVE THEREFOR

This application claims priority to German Patent Application Serial No. DE 202015006366.7, filed Sep. 7, 2015.

The present invention relates to a drinking and service water supply device of a building with a house connection connected to the public supply network and with at least one circulation pipe leading to at least one consumer.

A supply device of this nature is e.g. known from DE 10 2006 017 807 A1, EP 1 845 207 A1 or EP 1 887 150 A1. The supply device according to the invention is here a supply device for hot water with circulation inlets and outlets for the circulation of the hot water and a circulation pump to circulate the hot water contained in the circulation pipe. The circulation pipe is normally connected to a heat generator or another hot-water source.

Circulation serves to provide hot water of the desired hot-water temperature near the consumer in a steady manner. Hot water standing in the pipe would cool down, so that upon tapping of hot water it would at first not be the hot water of the desired temperature that would be delivered to the consumer. Moreover, due to this cooling a temperature level would be reached at which germs contained in the drinking water would proliferate considerably, whereby the drinking water would no longer be useable unrestrictedly.

In a hot water supply device of this nature, it is desired to replace, as rapidly as possible, relatively strongly cooled-down hot water by heated water from the hot water source of the supply device. Therefore, a circulation pipe of a hot water supply device of this nature is normally provided with a regulating valve which can produce a flow resistance that can be regulated.

AT 228 018 B discloses a regulating valve which comprises a valve seat and a valve body in the form of a tube. The valve body is introduced via a thread into the valve housing and can be moved with a tool relative to the valve seat. The tube forming the valve body forms itself, on its inner circumference, a valve seat against which a check valve is pressed in closed position by a spring, so that different flow resistances can be produced, depending on the flow direction. Regulation is carried out in that the tube is screwed either towards or away from the valve seat of the valve housing.

A circulation pipe of a hot water supply device of the above-mentioned type is normally provided with a thermal regulating valve which independently regulates the flow resistance normally with the help of an expansion element which expands or contracts upon change in the temperature. Mostly, the thermal regulating valve sets a relatively high flow coefficient $C_v$ in a low temperature range and a relatively small flow coefficient $C_v$ in a high temperature range, so that the flow rate at relatively high temperatures is kept low and the flow rate at relatively low temperatures is kept high to replace as rapidly as possible relatively strongly cooled-down hot water by heated hot water from the hot water source of the supply device. Hot water temperatures below 50° C. are regarded as low temperatures. High temperatures are above this limit value.

The thermal regulating valve is normally located at the end of a line which is formed as part of the circulation pipe and normally feeds plural consumers which are arranged in the vertical one above the other and in the horizontal side by side. The above-mentioned DE 10 2006 017 807 A1 discloses a system in which consumers of this nature that are connected to a line are each connected via a ring pipe to the line. The ring pipe branches off from the line and ends in the line. A flow resistance element is normally provided between the discharge out of the line and the return from the ring pipe into the line, so that a flow is forced through the ring pipe when a flow arises due to water withdrawal in the line. The devices creating the flow in the ring pipe in case of a flow through the line are e.g. described in EP 1 882 784 A1, EP 2 167 740 A1 or EP 2 098 647 A1 of the present applicant.

The above-discussed solutions for the forced flow through a drinking and service water supply device follow from ideas regarding enhanced cleanness of the drinking water and service water. They are particularly also intended to prevent contamination. Desired is an at least cyclic exchange of the whole water within the drinking and service water supply device. The corresponding efforts also lead to a demand for components configured in a correspondingly adapted manner for the drinking and service water supply device.

The present invention wants to indicate a regulating valve which in an improved manner satisfies the technical demands made by drinking and service water, which is as sterile as possible, through permanent exchange of water in corresponding supply devices. Furthermore, the invention wants to indicate an improved drinking and service water supply device.

To solve this problem, the present invention indicates a regulating valve with the features of claim 1. Said regulating valve is a regulating valve for hot-water circulation systems. The regulating valve has a valve housing which may be designed as a metal casting or as a plastic part. A thermostatic element which is controlled by the water temperature is installed into this valve housing as a setting element for a regulation member. The regulation member cooperates with a flow opening between inlet and outlet channel of the valve housing to regulate the water flow rate through the regulating valve and the pipe connected thereto. Furthermore, a setting device is normally provided for presetting the regulation member. Such a regulating valve is for instance known from EP 1 372 054 A1, DE 100 56 715 A1 or DE 298 05 921 U1.

The regulating valve according to the invention has a direction-dependent regulation element which upon flow through the regulating valve in one direction increases the flow coefficient $C_v$ of the regulating valve independently of the position of the setting member and upon flow through the regulating valve in opposite direction does not lead to an increase of the flow coefficient $C_v$. The direction-dependent regulation element thus allows, by increasing the flow coefficient $C_v$, a flow through the regulating valve in the one direction, normally solely on account of the pressure difference causing this flow in the one direction. Due to this pressure difference the direction-dependent regulation element opens, so that in this one direction water can flow through the regulating valve relatively unhindered also in cases where the setting member just predetermines a minor or even minimal, optionally also a thermally controlled, shutting off of the regulating valve.

As has already been mentioned above, the direction-dependent regulation element is normally just operative on account of the pressure difference that creates the flow through the regulating valve in the one or in the other direction. For instance, the direction-dependent regulation element normally has a regulating body which abuts under preload on a sealing seat and, at a pressure difference causing the flow in the one direction, lifts off from the sealing seat due to this pressure difference and thus considerably increases the flow coefficient $C_v$ of the regulating valve by comparison with the previous state. A considerable increase is here an increase of the flow coefficient $C_v$ by comparison with the closed state by at least 50%, preferably by at least 75%, particularly preferably by at least 100%.

The flow increasing the flow coefficient $C_v$ in the one flow direction can here take place with the help of a bypass recessed in the valve housing. This bypass is provided for bridging the valve seat in the valve housing. Bridging the valve seat particularly means that upon flow through the regulating valve in one direction the part of the flow that passes through the bypass does not pass through the opening which is defined by the valve seat. Normally, the bypass forms an alternative route for the flow within the valve housing. The direction-dependent regulation element is mounted in the bypass and thereby controls the flow through the bypass in a direction-dependent manner, i.e. allows the flow through the bypass in the one flow direction and normally prevents a flow in the opposite direction completely.

The direction-dependent regulation element may here preferably be formed by a CV cartridge, i.e. a check valve cartridge which is known per se. This configuration offers the advantage that standard components can be installed for producing the regulating valve according to the invention. The CV cartridge is here sealingly inserted in the bypass. Preferably, the CV cartridge is locked with the valve housing. To this end the housing of the CV cartridge which cooperates with walls of the valve housing normally comprises projecting locking noses which engage into lock grooves of the valve housing when the CV cartridge is inserted into the bypass. In the locked state the CV cartridge is sealingly inserted into the valve housing and fixed therein.

According to an alternative design of the present invention the regulation member itself is designed as a direction-dependent regulation element. The regulation member is here on the one hand provided by the thermostatic element as the setting member. In addition, the regulation member is designed such that it releases the flow opening in the area of the valve seat more and more due to the operative flow direction or pressure difference within the valve housing when the water flows in in the one direction, whereas normally the regulation member does not change its position which is set by the thermostatic element when the water flows in the opposite direction. To this end the regulation member is preferably held in a preloaded state against the one flow direction. For instance the hot water flow while flowing in the one flow direction can move the regulation member against the preload force, thereby releasing the flow opening in an augmented manner. The preload force is here adjusted such that the regulation member at the flow pressures to be expected of the supply flow to be allowed in the one direction enlarges this flow opening between itself and the valve seat. The preload force is here preferably created by a spring, particularly a coil spring.

Furthermore, a stop is preferably provided, on which the regulation member held in a preloaded state abuts upon flow in the opposite direction. This design guarantees that the regulation member is held relative to the setting member in a predetermined orientation and arrangement when the hot water flows in the opposite direction. The abutment of the regulation member on the stop by the preload force is here normally also accomplished when there is no flow at all, i.e. when for instance the regulating valve has not been installed yet. The stop is preferably formed directly on the setting member.

With a view to an exact adjustment of the temperature by the thermostatic regulating valve, it is suggested according to a preferred development that the regulation member is configured to be movable through the flow opening. The flow opening is thus at least slightly greater than the regulation member, which allows on the one hand a more accurate setting of a minimal flow volume at a high hot-water temperature, optionally also a rise of the volume flow for thermal disinfection at very high water temperatures of more than 70° C. by correspondingly contouring the regulation member. The regulating valve may also be designed such that a rebounding of the regulation member upon flow in the one direction has the effect that the regulation member penetrates the flow opening and thus releases the flow opening more and more.

The regulating valve according to the invention is preferably installed in a drinking and service water supply device which per se can be essential for the invention and is indicated in claim 9. Instead of such a regulating valve formed in a uniform manner with a direction-dependent regulation element, it is however possible to install a standard thermostatic regulating valve in the drinking and service water supply device and in parallel with a direction-dependent regulation element of the above-described type. This also accomplishes a design in the case of which upon flow through the regulating valve in one direction the flow coefficient $C_v$ is increased across the regulating valve independently of the position of the setting member, whereas the flow coefficient $C_v$ is not increased in case of a flow in the opposite direction. The flow coefficient $C_v$ whose input variables are determined in flow direction in front of and behind the unit consisting of parallel-connected regulating valve and direction-dependent regulation element is considered as an increase of the flow coefficient $C_v$ across the regulating valve. This primarily includes the pressure difference across the parallel-connected elements. With this design the regulating valve may be a commercial thermostatic regulating valve for the thermostatic regulation of the circulation in a drinking or service water supply device. This device has backflow preventers that are provided at the inlet and the outlet of the circulation pipe and are arranged such that hot water can flow into the circulation pipe both from the inlet side and from the outlet side. Thus the circulation pipe preferably has a nominal diameter which corresponds to the nominal diameter of a supply pipe (DN20 or more). Each branch of the circulation pipe from the inlet to the consumer on the one hand or from the outlet to the consumer on the other hand can thus be used as a feed pipe to the consumer. Each of the backflow preventers allows a directed flow from a hot water reservoir either from the inlet side or from the outlet side to the consumer. A circulation pump is provided in a manner known per se with respect to the circulation pipe. However, circulation inlets and outlets for the circulation of the hot water are provided that are normally implemented as circulation feed and discharge pipes in parallel with the inlets and outlets and may thus also be designed with a smaller nominal size (for instance DN15 or less). The normal circulation for maintaining the hot water temperature within the circulation pipe takes place through these circulation inlets and outlets. These circulation inlets and outlets are also normally provided with backflow preventers to allow a flow directed in only one direction through the circulation pipe. Here, the inlets and outlets of the circulation, which are supply pipes, and also the circulation inlet normally branch off from a standardized hot water supply pipe, whereas the circulation outlet with a small nominal size is connected to the hot water treatment to heat hot water that has cooled down and to make it available for hot water consumption or circulation. The above-mentioned regulating valve according to the invention or the unit consisting of thermostatic regulating valve and direction-dependent regulation element arranged in parallel therewith is here provided between the backflow preventers at the inlet and outlet side. Normally, the regulating valve or the unit is located at the end of a line which feeds plural consumers, preferably plural ring pipes leading to the respective consumers. For instance, it is possible upon water withdrawal by one of the consumers to deliver hot water to the consumer in the circulation direction and/or in a direction opposite to the circulation direction. Upon delivery in a direction opposite to the circulation direction, which represents the "one direction" in the above sense, the flow coefficient $C_v$ is increased abruptly via the regulating valve, so that the service water supplied to the consumer in a direction opposite to the circulation direction can pass substantially unhindered through the regulating valve. If the withdrawal of water out of the circulation pipe is stopped, the flow coefficient $C_v$ is returned to the original value by closing the direction-dependent regulation element. The flow coefficient $C_v$ is relatively small. The thermostatically provided setting member regulates the passage of the hot water in circulation direction through the regulating valve in response to the temperature of the hot water. However, if the consumed hot water is supplied in circulation direction to the consumer, this will result in a flow between the inlet of the circulation pipe and the consumer, i.e. the hot water is discharged in flow direction before the regulating valve. The regulating valve can maintain the state which is solely set by the thermostatic element.

Further details and advantages of the present invention will become apparent from the following description of an embodiment in conjunction with the drawing, in which.

Figure 1:
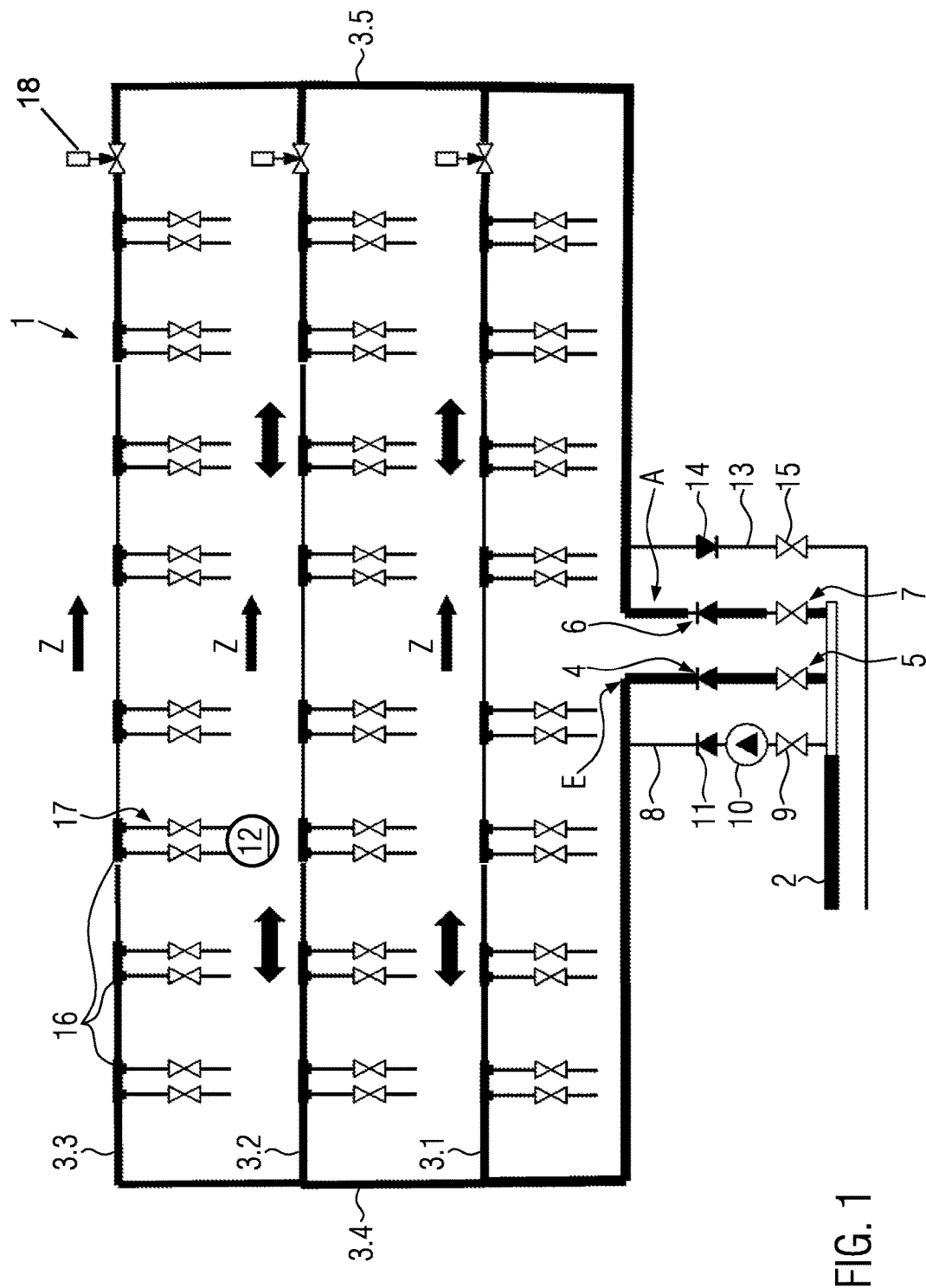
FIG. 1 shows an embodiment of a drinking and service water supply device.

FIG. 1 is a schematic view showing an embodiment of a drinking and service water supply device 1 of a building (not shown in detail). The building has a house connection (not shown) which is connected to the public supply network to supply the building with fresh water. This fresh water is normally cold water, which is normally treated within the building to obtain hot drinking water or service water. To this end the building has a thermal system and normally a reservoir for storing a certain amount of hot water.

A central supply pipe 2 branches off from these components used for hot water treatment. Reference numeral 3 marks a circulation pipe which in the illustrated embodiment is divided into a plurality of storey lines 3.1, 3.2 and 3.3 which are laid horizontally on different storey levels and in parallel with one another. For instance, the circulation pipe 3 has a standardized ascending line 3.4 and a standardized descending line 3.5. The ascending line 3.4 is connected to the supply pipe 2 via a backflow preventer 4, which is provided at an inlet E, and via a shut-off valve 5. The other line 3.5 is connected at an outlet A via corresponding devices 6, 7 to the supply pipe 2. The backflow preventers 4, 6 are here configured to allow a corresponding introduction of hot water from the supply pipe 2 into the circulation pipe 3, but they block a reverse flow. The above-mentioned pipes, i.e. the supply pipe 2 and at least the lines 3.4 and 3.5, have a nominal size of DN20 or more and are designed as a supply pipe. The nominal diameter of the circulation pipe 3 is decreasing, normally starting from the inlet E at any rate from a branch which leads to one of the storey lines 3.1, 3.2, 3.3 up to about the middle of the corresponding lines 3.1, 3.2, 3.3. In the middle region of the storey line the diameter may be reduced to DN15. After this narrowest point it is again increasing towards the outlet.

Reference numeral 8 marks a circulation feed pipe which has a narrower nominal size, e.g. a nominal size of DN 15 and has interposed therein a shut-off valve 9, a circulation pump 10 and a backflow preventer 11 in this sequence. Circulation pump 10 and backflow preventer 11 cause a circulation flow which ensures that hot water is always available near consumers 12, namely even if no water has been taken from the supply device 1 for a long time. The circulation flow created by the circulation pump 10 is marked with arrow Z for the corresponding storey lines 3.1 to 3.3.

The end of the line 3.5 which is remote from the flow in circulation direction has connected thereto a circulation discharge pipe 13 which leads via a backflow preventer 14 and a shut-off valve 15 to the hot water treatment within the building. The backflow preventer 14 prevents that from there, when service water is drawn via a consumer 12 of the device 1, water is taken from the hot water treatment in a direction opposite to the circulation direction Z.

Reference numeral 16 marks flow dividers which are described in more detail in EP 1 882 784 A1, EP 2 167 740 A1 or EP 2 098 647 A1, which go back to the present applicant. Reference is made to the disclosure of these patent applications to avoid any reiterative remarks. The content of these patent applications is incorporated at least in this respect into the content of disclosure of the present application. The flow dividers 16 cause a circulation within a ring pipe, which is marked with reference numeral 17 and leads to the consumer 12, at any flow within the associated storey line 3.1, 3.2 and 3.3, respectively. For instance, the flow dividers 16 are preferably configured as described in EP 2 098 647 B1 of the present applicant.

A regulating valve 18, which will be explained in more detail hereinafter, is interposed behind the last flow divider 16 in circulation direction Z. A regulating valve 18 of this nature is provided for each line 3.1, 3.2 and 3.3.

Figure 2:
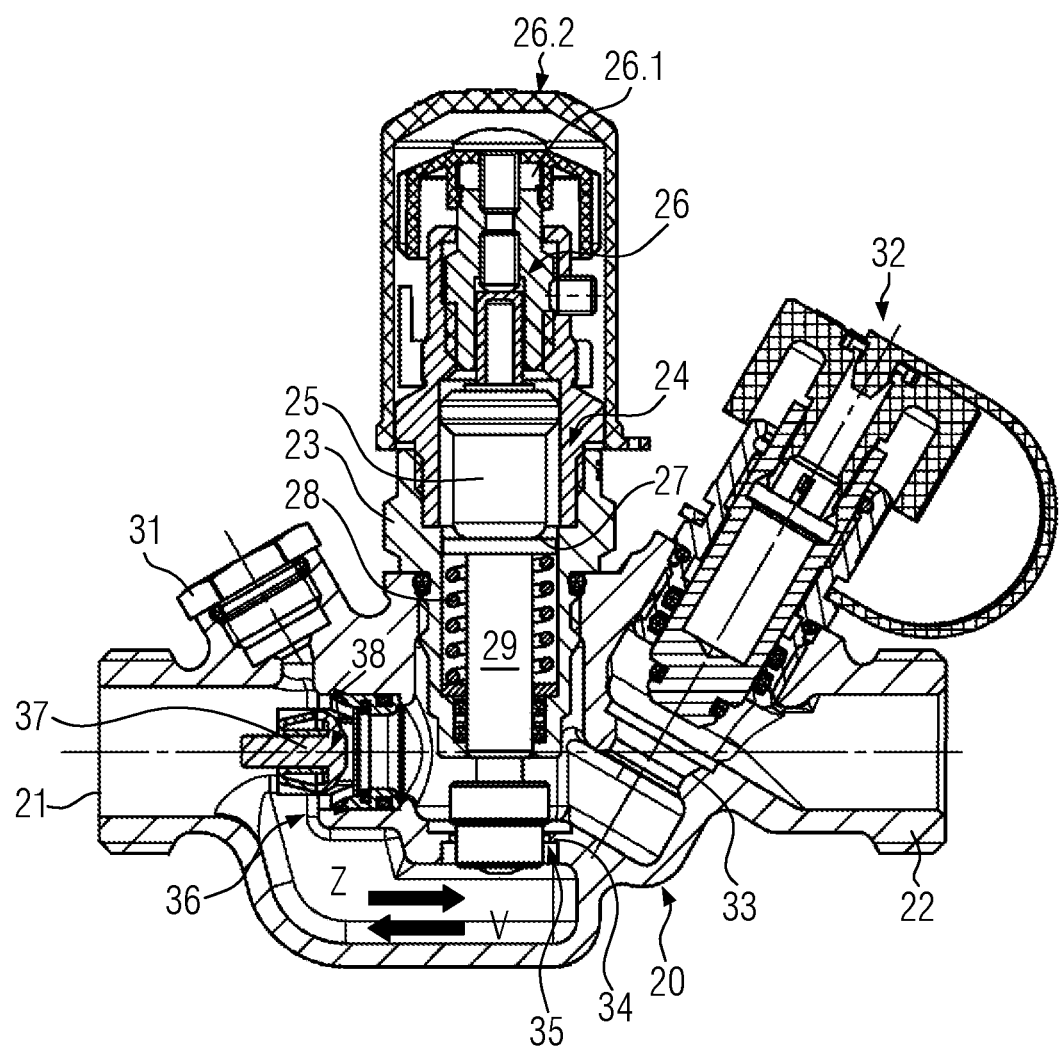
FIG. 2 is a longitudinal sectional view of a first embodiment of a regulating valve.

Details of the regulating valve 18 are illustrated in FIG. 2.

The regulating valve 18 has a valve housing 20 with a connection 21 for a feed pipe and a connection 22 for a discharge pipe. The feed pipe corresponds to the respective storey lines 3.1, 3.2 and 3.3, respectively, whereas the discharge pipe is part of the descending line 3.5. The circulation direction is also indicated in FIG. 2 with arrow Z. Arrow V indicates the supply flow, which will be discussed in more detail hereinafter.

The valve housing 20 forms a nozzle-shaped receptacle 23 for a valve insert marked with reference numeral 24. The receptacle 23 is formed by a valve top which is screwed with its external thread into an internal thread of the valve housing 20. The valve insert 24 has a receptacle for an expansion element 25 of a thermostatic regulator 26. The expansion element 25 acts on a plate 27 which is kept preloaded against the force of a spring 28 towards the expansion element 25. A plunger 29 which carries a regulation member 30 is coupled to the plate 27. The plunger 29 and thus the thermostatic valve can be preset by bolting an adjustment cap 26.1 of the thermostatic regulator 26. This adjustment cap 26.1 is covered by a protection cap 26.2 in FIG. 2.

Furthermore, the valve housing 20 forms a connection nozzle for sealingly bolting a drain plug 31. Furthermore, a shut-off valve 32 is provided which is operable by hand to manually shut off the regulating valve 18 by placing the shut-off valve 32 against a straight type seat 33.

Figure 3:
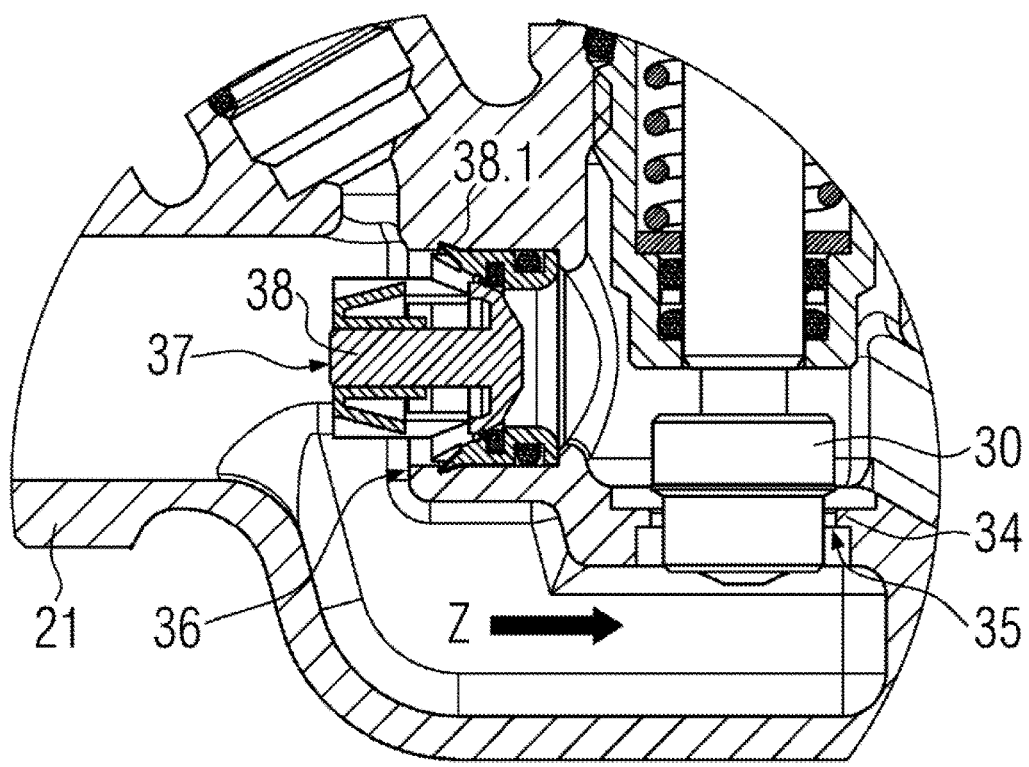
FIG. 3 shows the detail plotted in FIG. 2 on an enlarged scale in the closed state of the direction-dependent regulation element.
Figure 4:
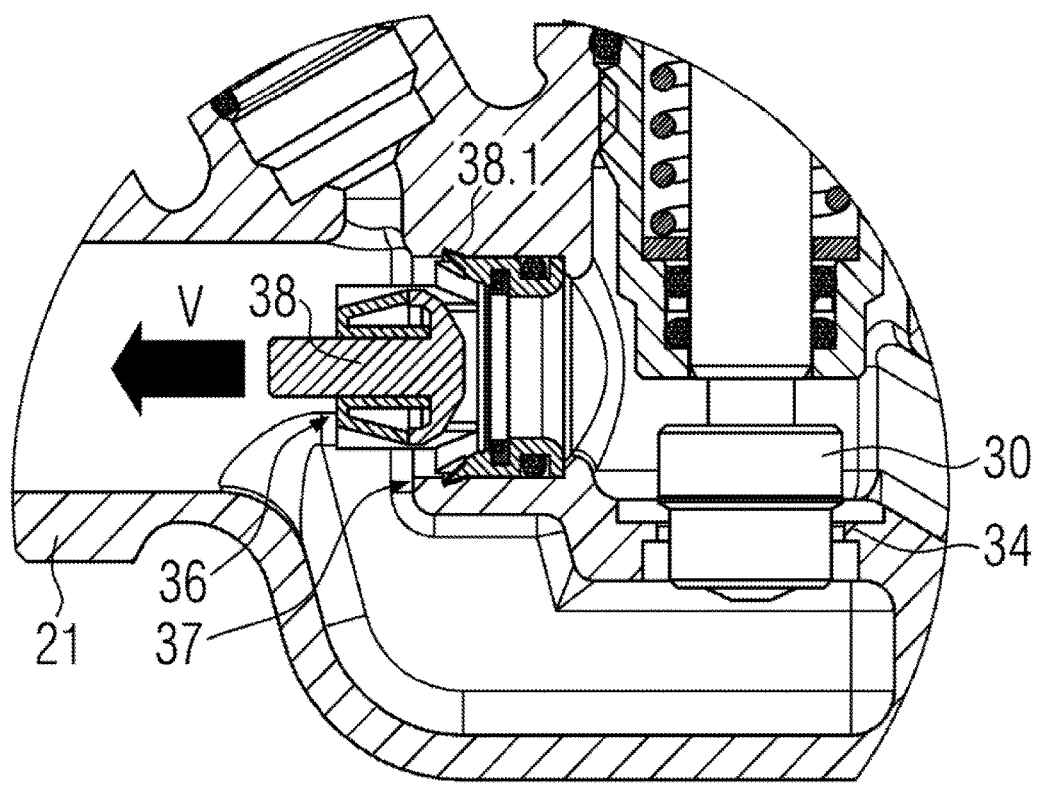
FIG. 4 shows the illustration according to FIG. 3 in the opened state of the regulation element.

Further details of the regulating valve 18 are shown in FIGS. 3 and 4, which will be referred to hereinafter.

The valve housing 20 forms a valve seat which is marked with reference numeral 34 and which leaves a flow opening 35 between itself and the regulation member 30. In FIGS. 3 and 4, this flow opening 35 allows a circulation volume flow. Furthermore, the valve housing 20 forms—in extension of the connection 21—a bypass 36 which is formed as a through bore between the plunger 29 and the connection 21. A CV cartridge 37 with a valve cap 38 which is held in spring-preloaded fashion is provided in this bypass 36. The CV cartridge 37 is sealingly inserted into the bypass 36. The valve housing 20 forms a circumferential groove which is engaged by locking projections 38.1 of the CV cartridge 37 to lock the CV cartridge 37 which at the opposite side abuts on a ring projection 39 formed by the valve housing 20. The CV cartridge 37 is sealed on the outer circumference with respect to the valve housing 20.

The CV cartridge 37 forms an embodiment of a direction-dependent regulation element in the sense of the present invention. With a circulation flow Z according to FIG. 3 the CV cartridge 37 closes the bypass 36.

By contrast, with a flow through the regulating valve 18 from the opposite side, i.e. when hot water is introduced through the outlet side A and thus the connection 22, the CV cartridge 37 opens and allows the passage of a supply flow V. Said supply flow V substantially bridges the flow opening 35. By opening the CV cartridge 37 according to FIG. 4, the flow coefficient $C_v$ of the regulating valve 18 is increased abruptly. With a flow in FIG. 2 from the left side to the right side, i.e. from the connection 21 to the connection 22, this yields a flow coefficient $C_v$ at a pressure difference $\Delta P$ of 100 mbar across the thermostatic regulating valve and at a nominal diameter of the connected tubes of 15 mm of about 130 liters per hour. By contrast, with a flow in opposite direction in the embodiment according to FIG. 2, the CV cartridge 37 allows a volume flow at the same pressure difference of about 1,400 liters per hour. Hence, despite a flow solely set by the thermostatic regulator 26 at a low level through the flow opening 35, the regulating valve 18 allows an almost unhindered throughput of the hot water through the regulating valve 18. On the other hand, if water is taken by a consumer 12 arranged near the ascending line 3.4, the service water to be taken is supplied via the inlet E and thus the ascending line 3.4 in the customary manner. The pressure difference which is here operative need not necessarily lead to a decrease of the flow coefficient $C_v$ of the regulating valve 18 and to a partial supply flow through this regulating valve 18 towards the corresponding consumer.

With this knowledge, the following flow conditions are obtained in the embodiment of the drinking and service water supply device according to FIG. 1: A circulation stream is generated by the circulation pump 10. This stream is regulated within the individual storey lines 3.1 to 3.3 by the temperature-related position of the regulation member 30 via the thermostatic or expansion element 25 as the setting member and thus in response to the respective water temperature in the line 3.1 to 3.3. If hot water is here tapped in a wet cell via a consumer 12, hot water can be delivered to said consumer through both lines 3.4, 3.5, i.e. both in circulation direction Z and opposite to the circulation direction Z. If the pressure conditions within the device are such that due to the pressure difference a supply is possible also or exclusively via the line 3.5, the direction-dependent regulation element in the form of the CV cartridge 37 will open. The flow coefficient $C_v$ of the regulating valve 18 is increased abruptly (FIG. 4). When the tapping operation is completed at the corresponding consumer 12, the previous operative state in which the circulation flow Z is regulated in the respective storey line 3.1 to 3.2 will again prevail at the regulating valve (FIG. 3). Here, the regulating valve 18 has a considerably smaller flow coefficient $C_v$.

Figure 5:
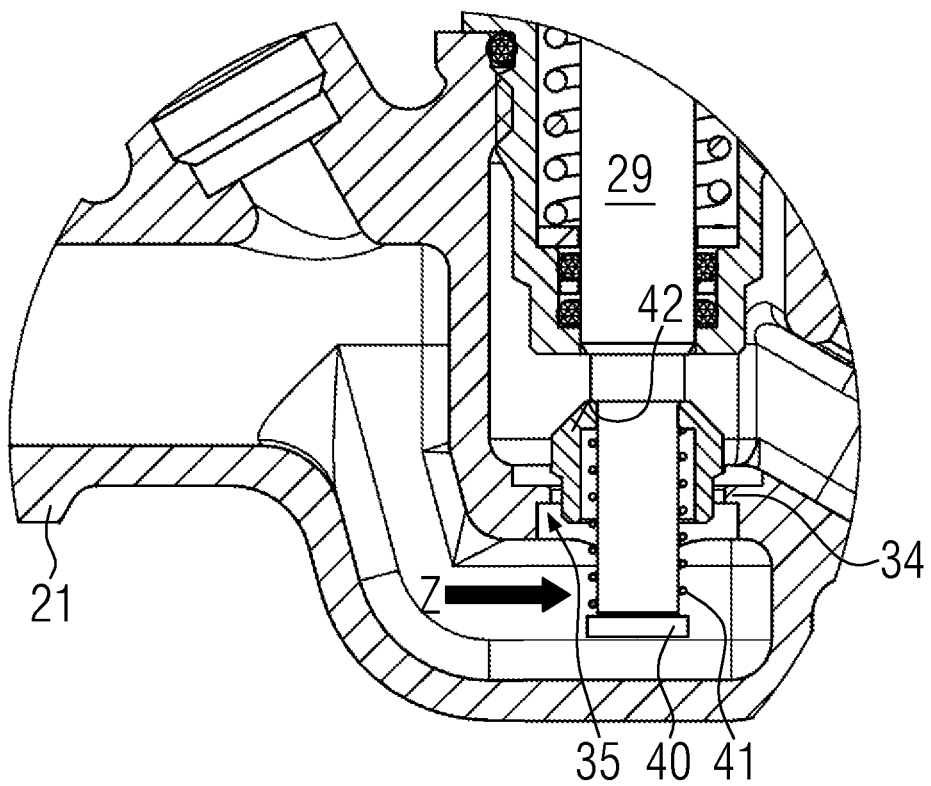
FIG. 5 shows an illustration according to FIGS. 3 and 4 for an alternative embodiment in the closed state of the direction-dependent regulation element.
Figure 6:
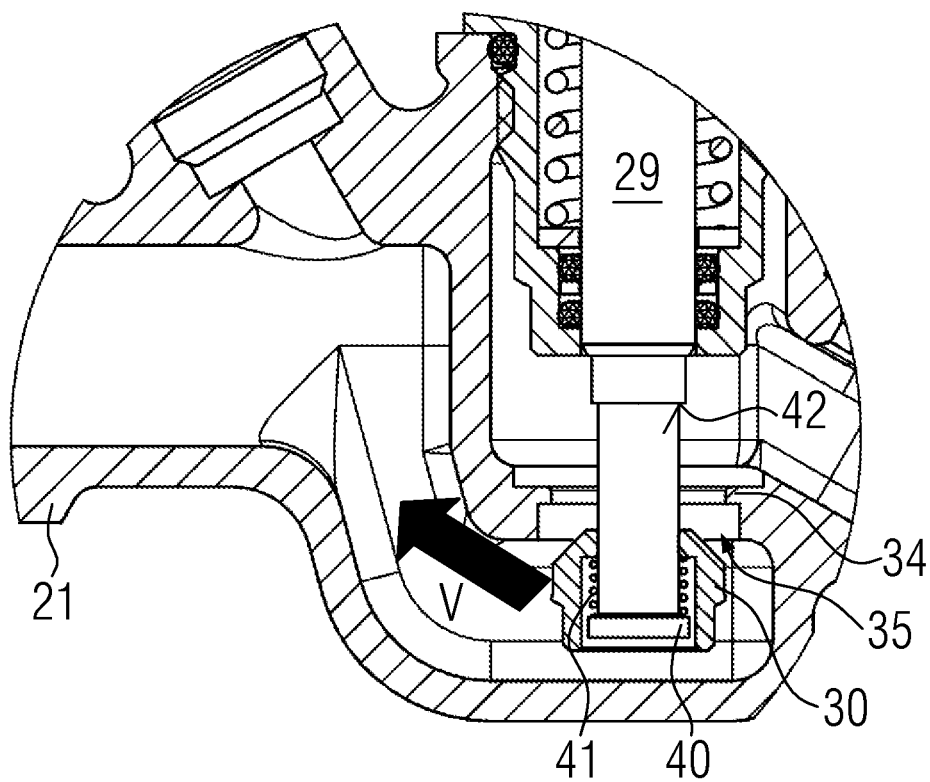
FIG. 6 shows the embodiment according to FIG. 5 in the opened state of the direction-dependent regulation element.

An alternative embodiment with respect to the embodiment according to FIGS. 3 and 4 is shown in FIGS. 5 and 6. In this variant the plunger 29 is provided at the end side with a ring shoulder 40 which is provided at a plug screwed at the end side into the plunger 29. The ring shoulder 40 carries a coil spring 41 which places the regulation member 30 against a stop which is marked with reference numeral 42 and implemented on the plunger 29. This position shown in FIG. 5 is obtained at any rate whenever the regulating valve 18 conducts the circulation flow Z alone.

If a supply flow V is desired as in the previously described embodiment, the pressure difference which causes this supply flow compresses the regulation member 30 against the spring 41. The regulation member 30 is passed through the flow opening 35. By comparison with FIG. 5, the regulation member 30 is now positioned at another side relative to the valve seat 34, i.e., it has penetrated the flow opening 35. The free passage through the flow opening 35 is definitely enlarged, so that the supply flow V can pass through the regulating valve 18 in a substantially unhindered manner.

LIST OF REFERENCE NUMERALS 1 drinking and service water supply device
2 supply pipe
3 circulation pipe
3.1 storey line
3.2 storey line
3.3 storey line
3.4 ascending line
3.5 descending line
4 backflow preventer
5 shut-off valve
6 backflow preventer
7 shut-off valve
8 circulation feed pipe
9 shut-off valve
10 circulation pump
11 backflow preventer of the circulation feed pipe
12 consumer
13 circulation discharge pipe
14 backflow preventer
15 shut-off valve of the circulation discharge pipe
16 flow divider
17 ring pipe
18 regulating valve
20 valve housing
21 connection for the feed pipe
22 connection for the discharge pipe
23 nozzle-shaped receptacle 24 valve insert
25 expansion element
26 thermostatic regulator
26.1 adjustment cap
26.2 protection cap
27 plate
28 spring
29 plunger
30 regulation member
31 drain plug
32 shut-off valve
33 straight type seat of the shut-off valve
34 valve seat
35 flow opening
36 bypass
37 CV cartridge
38 valve body
38.1 locking projections
39 ring projection
40 ring shoulder
41 coil spring
42 stop
A outlet
E inlet
V supply flow
Z circulation flow

The invention claimed is:

1. A regulating valve (18) for hot-water circulation systems, comprising:
a valve housing (20) into which a thermostatic element (25) which is controlled by water temperature is installed as a setting member for a regulation member (30) which cooperates with a valve seat (34) with a flow opening (35) between an inlet channel (21) and outlet channel (22) of the valve housing (20) for regulating the water flow rate, and
further comprising a direction-dependent regulation element (37) mounted in a bypass (36) recessed within the valve housing (20) for bridging the valve seat (34),
wherein a flow (V) through the regulating valve (18) in one direction increases the flow coefficient $C_v$ of the regulating valve (18) independently of the position of the setting member and a flow through the regulating valve (18) in opposite direction does not cause an increase of the flow coefficient $C_v$,
wherein the regulation member (30) can be passed through the flow opening (35), and wherein the flow opening (35) is always open to allow a circulation volume flow.

2. The regulating valve according to claim 1, wherein the direction-dependent regulation element is configured as a CV cartridge (37) and is sealingly inserted in the bypass (36) and wherein the CV cartridge is locked with the valve housing (20).

3. The regulating valve according to claim 1, wherein the regulation member (30) is provided with a setting device (26) for presetting the regulation member (30).

4. The regulating valve according to claim 1, wherein the thermostatic element (25) causes the regulating valve (18) to have a higher flow coefficient $C_v$ at water temperatures lower than 50° C. than at water temperatures between 50° C. and 70° C.

5. The regulating valve according to claim 2, wherein the CV cartridge cooperates with walls of the valve housing and comprises locking projections which engage into lock grooves of the valve housing when the CV cartridge is inserted into the bypass.

6. A drinking and service water supply device (1) of a building, the drinking and service water supply device (1) comprising:
a house connection connected to a public supply network,
at least one circulation pipe (3) leading to at least one consumer (12),
a backflow preventer (4) provided at an inlet-side (E) of the circulation pipe (3) and a backflow preventer (6) provided at an outlet-side (A) of the circulation pipe (3), wherein the backflow preventers (4, 6) are arranged such that hot water can flow both from the inlet-side (E) and the outlet-side (A) of the circulation pipe (3) into the circulation pipe (3),
a circulation pump (10), a circulation inlet (8) and a circulation outlet (13) which are assigned to the circulation pipe (3) for the circulation of hot water through the circulation pipe (3),
at least one regulating valve (18) provided between the backflow preventers (4, 6), wherein said regulating valve (18) is installed between the inlet-side (E) and the outlet-side (A) in the circulation pipe and wherein said regulating valve (18) comprises a valve housing (20) into which a thermostatic element (25) which is controlled by the water temperature is installed as a setting member for a regulation member (30) which cooperates with a valve seat (34) with a flow opening (35) for regulating the water flow rate in circulation direction between the inlet side (E) and the outlet side (A),
a setting device (26) for presetting the regulation member (30), and
a direction-dependent regulation element (37) mounted in a bypass (36) which is recessed within the valve housing (20) for bridging the valve seat (34), wherein the direction-dependent regulation element (37, 41) is connected in parallel with the regulation member (30) in the circulation pipe and wherein the direction-dependent regulation element (37, 41), upon flow (V) through the regulating valve (18) from the outlet-side (A) to the inlet-side (E), increases the flow coefficient $C_v$ across the regulating valve (18) independently of the position of the setting member and, upon flow through the regulating valve (18) in opposite direction, does not cause an increase of the flow coefficient $C_v$.

7. The drinking and service water supply device (1) according to claim 6, wherein the direction-dependent regulation element of the regulating valve (18) is configured as a CV cartridge (37) and is sealingly inserted in the bypass (36) and wherein the CV cartridge is locked with the valve housing (20).

8. The drinking and service water supply device (1) according to claim 6, wherein plural consumers (12) are connected one after the other to the circulation pipe (5), and that various consumers (12) are each connected to the circulation pipe (3) via a ring pipe (17) which branches off from the circulation pipe and ends in said pipe.

9. The drinking and service water supply device (1) according to claim 6, wherein the regulation member (30) can be passed through the flow opening (35).

10. The drinking and service water supply device (1) according to claim 7, wherein the CV cartridge cooperates with walls of the valve housing and comprises locking projections which engage into lock grooves of the valve housing when the CV cartridge is inserted into the bypass.

11. The drinking and service water supply device (1) according to claim 6, wherein the thermostatic element (25) causes the regulating valve (18) to have a higher flow coefficient $C_v$ at water temperatures lower than 50° C. than at water temperatures between 50° C. and 70° C.

* * * * *